Jan. 6, 1970   T. W. JORGENSEN ET AL   3,487,497
DRIVING-IN SYSTEM FOR SLAUGHTER ANIMALS, PARTICULARLY PIGS
Filed July 12, 1967

United States Patent Office 3,487,497
Patented Jan. 6, 1970

3,487,497
DRIVING-IN SYSTEM FOR SLAUGHTER ANIMALS, PARTICULARLY PIGS
Tage Wichmann Jorgensen and Arne Laursen, Roskilde, Denmark, assignors to Slagteriernes Forskningsinstitut, Roskilde, Denmark
Filed July 12, 1967, Ser. No. 652,831
Claims priority, application Denmark, July 12, 1966, 3,607/66
Int. Cl. A22b 1/00, 3/00
U.S. Cl. 17—1                     7 Claims

ABSTRACT OF THE DISCLOSURE

A feed system for animals to be slaughtered comprises a number of elongate, adjacent pens which have sliding doors at exit ends thereof for the passage of the animals into an area where they are moved by an advancing gate to the entrance of a narrow passageway wherein the animals advance single file to an anesthesia station, the length of the passageway being sufficient to accommodate all the animals from a pen.

---

Figure 1:
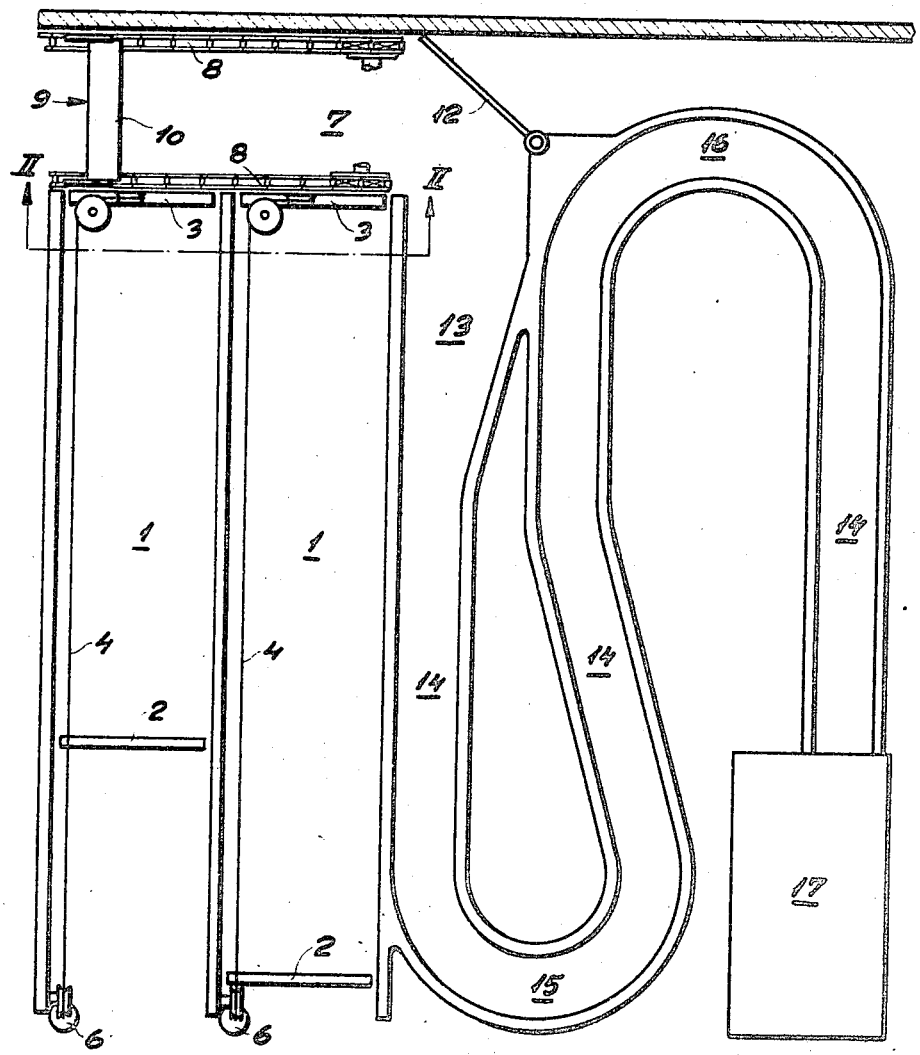

This invention relates to a driving-in system for animals to be slaughtered, particularly pigs, and is of the type which comprises a plurality of elongate pens placed side by side, and each of which has at one end—the entrance end—a gate while at the other end—the exit end—it leads into a drive passage; each pen comprising also a drive member movable from the entrance to the exit end.

Where such systems are used the slaughter animals are kept in the said pens in the period between delivery and slaughtering, and when they are to be slaughtered they are driven out of the pens by a man provided with an electrical driving rod and into the drive passage towards the anesthesia and slaughtering hall. Thorough investigations have shown that the psychic condition of the slaughter animals on arriving at the anesthesia station is of great importance for the quality of the meat, and when driven forward by the electrical driving rod as described here the animals will invariably arrive in a state of agitation, with the result that the quality of the meat has not always reached the standard which the quality of the slaughter animals had given ground to expect. Also, when the slaughter animals become excited they will often start to fight and in their agitation hurt each other so badly that haemorrhages occur in certain parts of the flesh, which will reduce the quality of the meat.

It is the object of the present invention to provide a driving-in system in which the animals are driven in a gentle and natural way and practically without agitation so that they reach the anesthesia state in a calm stage, whereby the risk of deterioration of the meat quality is substantially reduced.

To avoid causing this state of excitement account is taken of the existing knowledge of the group mentality innate in pigs; no confusion will arise because all the time the animals know which direction to follow, and they will not, as often happened previously, try to leave the group in panic so that stronger measures had to be adopted to direct them towards the desired goal.

These specific advantages have been achieved according to the invention by providing a gate at the exit end of each pen, by providing the drive passage with a plurality of driving plates adapted to be moved forward continuously by conveyor means, and by letting the drive passage lead into a narrow passageway of a width which permits passage of but one animal at a time and of a length sufficiently for receiving at least approximately all the animals from a pen. It will be appreciated that in the first place it has been achieved that by means of the driving plates in the drive passage the animals are driven quietly and gently in the desired direction; the animals approaching the narrow passageway in a quiet flock will also quietly, one by one and without agitation, enter this passageway where they will not in any way be hampered by other animals or by unpleasant mechanical devices, and they will therefore trot complacently through the relatively long passage together with the other animals of the flock from the pen. In fact, it is a feature of greater importance than has hitherto been appreciated that the animals who have grown accustomed to each other in the pen like to remain together and therefore willingly follow one another into such a narrow passage. The use of the specific driving plates in the drive passage necessitates the provision of a gate at the exit and of each pen. Often the drive passage is desired to have smooth walls at both sides, and it is then expedient according to the invention to form this gate as a sliding door; it may for instance be vertically slidable.

Moreover, it will be expedient according to the invention that the gate at the exit end of each pen is adapted for remote control from the entrance end of the pen so that the person who by means of the driving wall of the pen slowly drives the animals towards the drive passage will also be able to open the gate or sliding door so that the animals may enter the drive passage as the driving member is being advanced.

When the animals have entered the drive passage, they will be driven in the desired direction towards the anesthesia station by the driving means.

The driving-in system according to the invention may be further improved by bending the lower edge of each drive plate forward in the travelling direction of the plates, so that the animals at the back of the flock may be contacted slightly by the driving members which push at the lower part of their legs; this contact has no disturbing effect on the animals, but merely reminds them that they must hurry to catch up with the rest of the flock.

In a preferred embodiment of the driving-in system according to the invention, the entrance to the passageway is located at the side of the drive passage into which the pens lead. Thorough investigation have indicated that the entrance to the passage way will appear to the animals to be like the exit from the pen and the animals have been found to show a tendency to seek back so that they will feel tempted to enter the passageway when the entrance is located as stated above.

In another embodiment of the system according to the invention the passageway may be formed with at least one U-shaped curvature, the space available in a slaughter house being often insufficient for forming the passage way in a straight line.

Figure 2:
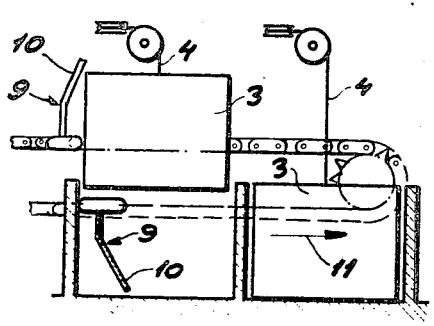

The invention will be described and explained here with reference to the drawing, in which FIG. 1 illustrates a driving-in system according to the invention viewed in plan, and FIG. 2 is a section taken along the line II—II in FIG. 1.

FIG. 1 shows part of a driving-in system according to the invention comprising a plurality of pens 1, in which the gates, indicated only schematically, are formed as driving walls 2 of the type shown in Czech Patent 110,525. A lift door 3 is provided at the exit of each pen, shown more clearly in FIG. 2, from which it will also be seen that the door is suspended by a cord and pulley drive 4 which is carried to the entrance end of the pen where it is provided with a counterweight 6, and which is also adapted to be operated so that the person starting the driving in from the entrance end of the pen may first open the door 3 and then start driving in by means of the driving wall 2.

When a door 3 is raised it provides entrance from the pen into an elongate drive passage 7 in which there are two lengthwise extending conveyor chains 8 supporting a plurality of driving plates 9 which, as shown clearly in FIG. 2, have a forwardly directed bent portion 10 at the bottom. The driving plates 9 are advanced in the direction perpendicular to pens 1 as indicated by the arrow 11 (FIG. 2), and hereby the slaughter animals are driven towards an inclined end wall 12 which, in the embodiment illustrated here, is formed as a swing gate and through which the operating staff has access to the drive passage. Approximately in the plane of the doors 3, is the entry of a funnel-shaped, narrowing passageway 13 which leads to a passageway 14 having two U-shaped curvatures 15 and 16 terminating at a carbon dioxide anesthesia station 17. The passageway 14 is of a width such that the animals can pass only single file therein and is of sufficient length to hold all the slaughter animals which have been kept in the pen 1 which is being emptied, and thus no accumulation of animals will occur at the entrance of the passageway; the animals may enter and pass on quietly towards the anesthesia station.

The system is described and explained here with a view to slaughter animals in general, but is designed to be used preferably for pigs although, in principle, it can be used also for other slaughter animals. The fact that the passage way may be provided with U-shaped curvatures involves the advantage that the entire passageway can be concentrated within a relatively small area close to the pens.

What we claim is:

1. A driving-in system for slaughter animals, particularly pigs, said system comprising a plurality of elongate pens placed side by side, each of which has an entrance end and an exit end, a gate constituted as a drive member slidably movable in each pen from the entrance end to the exit end thereof, an elongate drive passage situated at the exit ends of the pen and extending at right angles thereto, a gate at the exit end of each pen and constituted as a sliding door, driving plate means in said drive passage adapted to move forward in a direction perpendicular to the pens to advance the animals, a narrow passageway leading from said drive passage and extending substantially parallel to said pens, said passageway having a width which permits passage of only one animal at a time and a length which is sufficient for receiving at least approximately all the animals from a pen, and narrowing passageway leading from said drive passage to the first said passageway whereby the animals are gradually reduced to single file as they enter said first passageway.

2. A driving-in system according to claim 1 wherein the gate located at the exit end of each pen is adapted for remote control from the entrance end of the pen.

3. A driving-in system according to claim 1 wherein the driving plate means includes a plurality of drive plates, the lower edge of each drive plate being bent forwardly in the moving direction of the plates.

4. A driving-in system according to claim 1, wherein the entrance to the narrowing passageway is located at the side of the drive passage into which the pens open.

5. A driving-in system according to claim 1, wherein the narrow passageway has at least one U-shaped curvature.

6. A driving-in system according to claim 1 wherein said narrowing passageway lies adjacent an endmost pen and has an entrance approximately in the plane of the exit ends of the pens.

7. A driving-in system according to claim 6 wherein said driving plate means is advanced in a direction perpendicular to the longitudinal extent of the pens.

References Cited

UNITED STATES PATENTS

| | | | |
|---|---|---|---|
| 1,980,679 | 11/1934 | Graham. | |
| 3,246,631 | 4/1966 | Holm | 119—14.03 |
| 3,282,250 | 11/1966 | Cain | 119—14.04 |

FOREIGN PATENTS

| | | |
|---|---|---|
| 110,525 | 4/1964 | Czechoslovakia. |
| 396,640 | 2/1909 | France. |

LUCIE H. LAUDENSLAGER, Primary Examiner

U.S. Cl. X.R.
119—14.03, 14.04